April 4, 1939.                J. R. PIERCE                2,153,051
                        ELECTRIC WAVE RECEIVER
                        Filed Jan. 15, 1938

INVENTOR
J. R. PIERCE
BY
      H. A. Burgess
            ATTORNEY

Patented Apr. 4, 1939

2,153,051

UNITED STATES PATENT OFFICE 2,153,051

ELECTRIC WAVE RECEIVER

John R. Pierce, New York, N. Y., assignor to Bell Telephone Laboratories, Incorporated, New York, N. Y., a corporation of New York Application January 15, 1938, Serial No. 185,138

9 Claims. (Cl. 250—17)

This invention relates to the reception of electrical wave energy and more particularly to means for the evaluation of such energy.

An object of this invention is to provide a catholic receiver of electric wave energy.

Another object is to provide means for sampling a high frequency field.

A further object is to enable the measurement of high frequency field strength without inquiry as to its periodicity. The usual procedure in the reception of high frequency signals involves the employment of one or more tuned circuits resonant to the particular high frequency or, if a band, the mid-frequency of which reception is desired. In the case of heterodyne reception of which my invention is a species there is ordinarily further involved an auxiliary source of periodic electric energy usually of a frequency below those whose reception is required and this auxiliary source is made variable in frequency so that the beat note between the auxiliary source and the high frequency or band of high frequencies may be brought to a preselected position in the frequency spectrum and thus transduced through tuned circuits of fixed adjustment and resonant for frequencies of the said position and thence into a detector or other form of final receiver.

It is apparent that under this procedure it is necessary that the frequency to be received be in effect known in order that the proper adjustment for its reception may be made. According to the method of my invention no such adjustments are required. The input circuit for the high frequency is untuned and therefore non-discriminative. The auxiliary source of energy is set at a fixed, and it may be a very low, frequency and final reception is obtained in terms of the frequency of the auxiliary source and as a function of the amplitude of the received high frequency. By this means it is possible to construct a monitoring receiver which will continually monitor a field for the existence of high frequency waves. Direct evaluation of such waves may thus be made and, if desired, the signal thus received may be made to prompt a precise exploration of the high frequency field by means of selective receivers of conventional design. As indicative of particular embodiments of my invention reference is made to the drawing in which:

Figure 1:
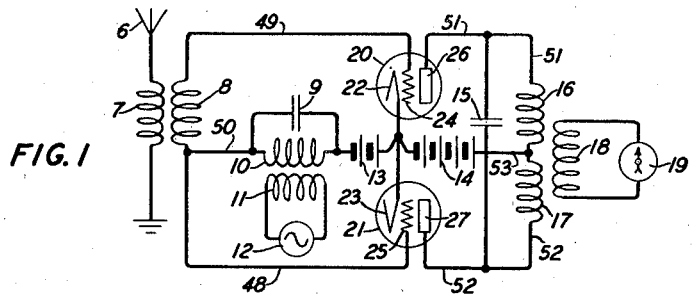
Fig. 1 represents a push-pull vacuum tube modulator according to the invention and may be used to measure high frequency field strength on a low frequency meter.

In Fig. 1, 20 and 21 represent electronic vacuum tubes of substantially similar physical and electrical characteristics having cathodes 22 and 23, control grids 24 and 25 and anodes 26 and 27. The heating source for the filamentary cathodes 22 and 23 is omitted for the sake of simplicity. An untuned or aperiodic high frequency input circuit is represented consisting of the antenna 6, primary coil 7 and secondary coil 8 connected in the control grid circuit of the vacuum tube 20. 12 is a low frequency source and may be for some purposes, for example, a source of 60 cycles alternating current. 10 and 11 represent the windings of a transformer coupling the low frequency source 12 into the common control grid-cathode circuit of the two vacuum tubes 20 and 21. 9 is a condenser of sufficient capacity so that it presents negligible impedance to frequencies of the order of those received through the high frequency coils 7, 8. It is, however, not large enough to constitute a material shunt across the winding 10. It may, in fact, be so proportioned as to tune with the residual inductance of the winding 10 so as to be anti-resonant at the frequency of the low frequency source 12. It is to be noted that under the conditions as proposed for Fig. 1, the inductance of the secondary high frequency winding 8 will not be such as to constitute a material impedance to frequencies of the order of the frequency of the low frequency source 12, particularly in comparison with the internal impedance of the grid-cathode circuit of the tube 20. 16, 17 and 18 represent the windings of the output transformer of the push-pull circuits constituted by the tubes 20 and 21. The winding 16 is connected in series-aiding with the winding 17 as the circuit is traversed from plate 26 through lead 51, winding 16, winding 17, lead 52 to plate 27. The winding 18 is the secondary of the output transformer and is connected to a receiver 19 which may be a voltmeter and indeed a 60-cycle voltmeter in case the low frequency source 12 is a 60-cycle source. The condenser 15 is proportioned to tune the output circuit, which consists mainly of the residual inductance of the windings 16 and 17 in series-aiding, to the frequency of the low frequency source 12.

Figure 2:
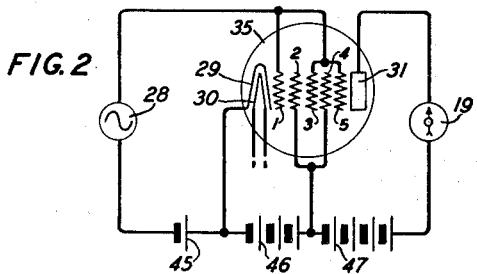
Fig. 2 represents a particular embodiment of vacuum tube structure which may be employed in the invention.

In Fig. 2 the vacuum tube 35 has five grids numbered 1, 2, 3, 4 and 5. Grids 1, 3 and 5 are connected together and form the control circuit of the vacuum tube. Grids 2 and 4 are connected to each other and with the plate 31 form the anode circuit of the tube. Tube 35 is shown as having, for example, an indirectly heated cathode 29 supplied by the heater 30, the power supply source of which is for simplicity not shown, whereas the battery 46 supplies to grids 2 and 4 potential positive with respect to the cathode, and batteries 46 and 47 in tandem supply to plate 31 potential positive with respect to the cathode. The control grid circuit consisting of grids 1, 3 and 5 is negatively biased with respect to the cathode by virtue of battery 45. 28 represents any suitable source of alternating potential, 19 represents a meter capable of registering the current flowing in the plate circuit of the vacuum tube 35.

Figure 3:
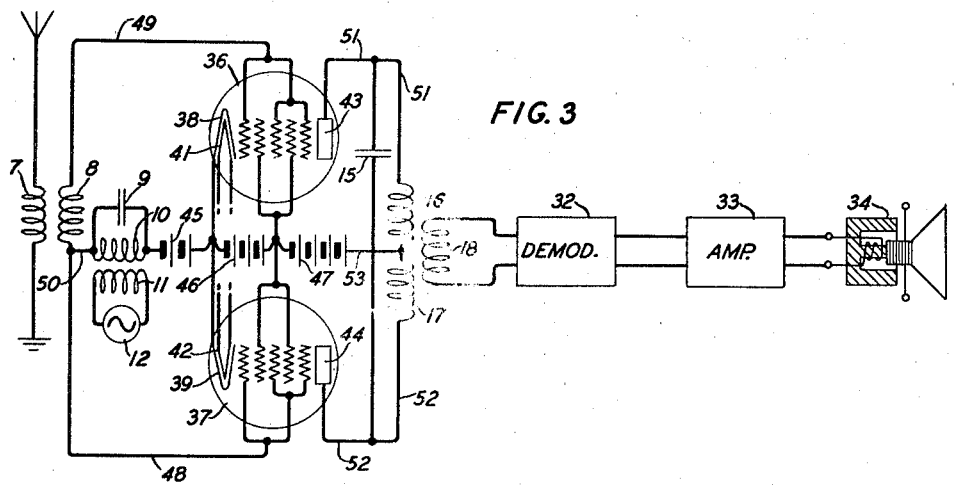
Fig. 3 represents a form of high frequency receiver according to the invention as it might be employed to monitor the ether waves.

In Fig. 3 an arrangement similar to Fig. 1 is shown except that the simple triode vacuum tubes of Fig. 1 are replaced in Fig. 3 by the special five-grid vacuum tube of Fig. 2. In this case the push-pull modulator of the invention is shown as it might be set up as a part of a broadcast receiver in which 6 is the receiving antenna and 7, 8 the high frequency input coils to the demodulator. In this case the frequency of the source 12 may be that of the usual intermediate frequency of a heterodyne radio receiver and to this frequency the output circuit 15, 16, 17, 18 may be tuned but not so sharply but that the sidebands of the broadcast transmission as based on the new carrier of the frequency of source 12 may be transmitted into the demodulator 32 whence as an audio-frequency signal it is carried through the amplifier 33 and into the speaker 34.

The method of operation of the invention will be more readily understood with the aid of the mathematical discussion which follows:

A general expression for the operation of a simple triode vacuum tube takes the form of the power series $$I_b = A_0 + A_1 E_g + A_2 E_g^2 + A_3 E_g^3 + \ldots \quad (1)$$

where $I_b$ is the plate or anode current and $E_g$ is the voltage on the grid and $A_0, A_1, A_2, A_3$, etc., are constants. Referring now to Fig. 1 let us assume that the high frequency voltage developed across winding 8 is $$E_a = e_a \cos at \quad a = 2\pi f_a \quad (2)$$

and the low frequency voltage developed across winding 10 is $$E_c = e_c \cos ct \quad c = 2\pi f_c \quad (3)$$

also let $I_1$ equal current in winding 16, $I_2$ equal current in winding 17 and $I_0$ equal current in winding 18. Substituting in Equation 1 we have $$I_1 = A_0 + A_1(E_a + E_c) + A_2(E_a + E_c)^2 + A_3(E_a + E_c)^3 + \ldots \quad (4)$$

$$I_2 = A_0 + A_1 E_c + A_2 E_c^2 + A_3 E_c^3 + \ldots \quad (5)$$

Now since the windings 16 and 17 are connected differentially, that is, in series-aiding from plate 26 to plate 27, the current $I_0$ in the output winding 18 will be proportional to the difference between $I_1$ and $I_2$ and $$I_1 - I_2 = A_1 E_a + A_2(E_a^2 + 2 E_a E_c) + A_3(E_a^3 + 3 E_a^2 E_c + 3 E_a E_c^2) + \ldots (6)$$

substituting Equation 2 and Equation 3 in Equation 6 we get the expression $$I_1 - I_2 = A_1 e_a \cos at + A_2(e_a^2 \cos^2 at + 2 e_a e_c \cos at \cos ct) + A_3(e_a^3 \cos^3 at + 3 e_a^2 e_c \cos^2 at \cos ct + 3 e_a e_c^2 \cos at \cos^2 ct) + \ldots \quad (7)$$

Since the output circuit including windings 16, 17, 18 and condenser 15 is tuned to the frequency $f_c$ of source $E_c$ only those currents as represented in Equation 7 by terms having substantially the frequency $f_c$ will appear in the output current $I_0$. It is evident from well-known trigonometric relations that only one term of Equation 7 as set down above lies in this category and that is the term $$3 A_3 e_a^2 e_c \cos^2 at \cos ct$$
$$= \frac{3}{2} A_3 e_a^2 e_c (\cos 2at + 1) \cos ct \quad (8)$$

and we have $$I_0 = K e_a^2 e_c \cos ct \quad (9)$$

where K is a new constant which includes the constant term $$\frac{3}{2} A_3$$

and also the transformation ratio of the transformer 16, 17, 18.

It will be evident, of course, that as the series as represented by Equation 7 is extended to higher powers other terms in $\cos ct$ will appear for each of the odd powers. For example, in the fifth order expression we find the term $$\frac{15}{8} A_5 e_a^4 e_c \cos ct + \frac{15}{4} A_5 e_a^2 e_c^3 \cos ct \quad (10)$$

Under ordinary conditions the contribution of these higher powers is negligible, however, and consideration of them will be omitted from further discussion.

Now assume that the high frequency voltage received from the winding 18 of Fig. 1 is a modulated wave as represented by $$E_{am} = e_a \cos at (1 + e_b \cos bt) \quad (11)$$

where the term within the parenthesis represents the two sidebands of a low frequency signal whose frequency is $$f_b = \frac{b}{2\pi}$$

The term $$3 A_3 E_a^2 E_c$$

of Equation 6 now becomes $$3 A_3 (e_a^2 \cos^2 at)(1 + e_b \cos bt)^2 e_c \cos ct \quad (12)$$

from which assuming that as before the output circuit is tuned to the frequency $f_c$ and that the frequency $f_c$ is large in comparison with $f_b$ so that the output circuit will pass without substantial distortion a frequency differing from $f_c$ by an amount equal to $f_b$, we find in the output current an expression $$I_0 = K e_a^2 e_c \cos ct (1 + 2 e_b \cos bt) \quad (13)$$

which is an expression for carrier and sidebands similar to Equation 11 except that the carrier now has a frequency $f_c$ instead of $f_a$ as received. It thus appears that if the receiver 19 of Fig. 1 is adapted for the reception of frequencies of the order of $f_c$ the frequency of the source 12, then it will respond to and evaluate incoming high frequencies as introduced through 7 and 8 and the rating will not depend upon the frequency of the incoming high frequency but only upon its amplitude. Thus if receiver 19 is in fact a 60-cycle voltmeter and source 12 is a 60-cycle supply, radio frequency voltages received through 6, 7 and 8 will be registered upon the said voltmeter and the reading thereof will be found to be proportional to the square of the amplitudes of the incoming high frequency signals, there being no reading on 19 in the absence of such signals.

Likewise, if the receiver represented by 19 of Fig. 1 is in fact a broadcast receiver of conventional type and adapted for broadcast reception on a carrier of frequency $f_c$ such as source 12, which in this case would ordinarily be made to have a frequency of intermediate value, for example, 100 kilocycles, then the invention as thus disclosed becomes in fact an air wave or, more properly, an ether wave monitor. By its use one is enabled to monitor the whole range of electromagnetic ether waves ordinarily referred to as radio, limited only by the design of the high frequency input circuit 6, 7, 8. The input circuit 6, 7, 8 is shown as an aperiodic circuit and is, in fact, so conceived for any proposed range of operations. It is well known, however, that any physical embodiment of an input circuit as shown and including an antenna 6 connected to ground through coil 7 with said coil 7 inductively coupled to the secondary coil 8 and then, for example, to the grid circuit of a vacuum tube as shown in Fig. 1, will in fact be limited in actual frequency range by reason of the parasitic impedances incidental to such embodiments. The said parasitic impedances are dependent for actual values upon the physical constants of the embodiment and the geometry of its relation to other physical objects and to ground. In practice, therefore, the input circuit as shown in 6, 7, 8 is designed for operation over a wide, but nevertheless definitely determined range.

It will be evident from the above discussion that my invention has a particular value in the exploration of ether wave fields. Thus in mapping a given area for average field strength, readings can be made directly without the requirement that the field be laboriously analyzed into a plurality of wave-lengths by means of a plurality of correspondingly resonant circuits. The effect of a new high frequency source on an established field is readily evaluated since the reading obtained for the field strength of a composite field is directly as the sum of the squares of the amplitudes of the several high frequency sources making up the field.

It is also readily apparent that means is here provided for simultaneously monitoring for signals from a plurality of radio transmitters of individual wave-lengths. Thus, if the signal comes in on any wave-length in the wide range to which the essentially aperiodic high frequency input circuit is responsive it will at once be detected. For such service the receiver 19 of Fig. 1 might take the form shown as demodulator 32, amplifier 33, and loud-speaker 34 of Fig. 3. The radio receiver of my invention would not ordinarily be employed for actual signal reception due to the likelihood of superposition of two or more simultaneous signals, the one upon the other, thus interfering with or preventing the interpretation of the individual signals. My receiver indicates the presence of signals and thus prompts putting into operation a suitable selective receiver by means of which individual signals may be properly segregated.

I have shown that my invention comprises a modulator capable of the production of modulation of odd orders higher than the first and have indicated that I rely preferably upon the production of third order modulation. As is well known it is possible to obtain appreciable higher order modulation products from a vacuum tube by adjusting the direct current operating potentials, particularly the grid bias potential so as to cause the tube to operate over the less rectilinear portion of its grid potential-plate current characteristic. I prefer, however, to employ a vacuum tube which by its structure is particularly adapted for the production of third order products. Such a structure is shown in Fig. 2.

Let $E_g$ be the potential of the alternating current source 28 of Fig. 2. The total space current passing grid 1 is largely dependent upon the potentials of grid 1 and assuming the relation approximately linear this current is $$I_1 = A_0 + A_1 E_{g1} \quad (14)$$

The proportion of this current passing grid 3 is largely dependent upon the potential of grid 3 and this is $$I_3 = I_1(B_0 + B_1 E_{g3}) \quad (15)$$

In the same way the proportion of this current passing grid 5 to the plate is expressed as $$I_5 = I_p = I_3(C_0 + C_1 E_{g5}) \quad (16)$$

but the tube is so arranged that $$E_{g1} = E_{g3} = E_{g5} = E_g \quad (17)$$

and therefore $$I_p = A'_0 + A'_1 E_g + A'_2 E_g^2 + A'_3 E_g^3 \quad (18)$$

It is evident that in a vacuum tube structure such as is shown in Fig. 2, an appreciable proportion of the current in 19 is a third order product and, furthermore, the third order production is shown to be a basic property of the particular tube structure. Triodes such as 20 and 21 of Fig. 1 are effective generators of third order modulation only under favorable and, in fact, somewhat critical circuit conditions. A usual practice is to adjust the grid bias practically to cut-off, that is, to the point where space current approaches zero in order to take advantage of that limited portion of the tube characteristics which departs markedly from a linear relation. On the other hand, the pentagrid tube of Fig. 2 may confidently be used for the production of third order modulation products over the whole characteristic.

In the arrangement of Fig. 3 is a modulator analogous in form and operation to that described in Fig. 1, the pentagrid tube of Fig. 2 being substituted for the triode of Fig. 1. It is to be noted that the receiver 19 of Fig. 1 has been shown elaborated and particularized in Fig. 3 as a fixed frequency radio receiving set designed for the reception of carrier current transmission having a carrier current of the frequency of the source 12, the said receiving set comprising a demodulator 32, the audio-frequency amplifier 33 and the audio-frequency loud-speaker 34. It will be understood that this particular embodiment is only by way of illustration and is not to be considered to circumscribe, delimit or define my invention.

The drawing and the descriptions thereof disclose operable and, under the particular conditions of illustration, preferred methods of practicing my invention. However, the scope of my invention is not to be considered as limited by this illustrative material but rather by the claims.

What is claimed is:

1. A high frequency receiving system comprising a push-pull modulator, a low frequency source connected in the common or parallel input circuit of said push-pull modulator, a high frequency input circuit connected in the individual input circuit of one-half only of said push-pull modulator, an output circuit of said push-pull modulator tuned to the frequency of said low frequency source, and connected thereto a receiver responsive to currents of the frequency of said low frequency source.

2. A high frequency receiving system according to claim 1 in which the push-pull modulator is characterized by the production of strong third-order modulation.

3. A high frequency receiving system comprising a pair of similar electronic vacuum tubes connected in push-pull relation, a low frequency source connected in the common or parallel portion of the control grid-cathode circuit of the pair of push-pull vacuum tubes so that the low frequency voltages of the respective control grids of said pair of tubes are substantially equal the one to the other in magnitude and phase, a high frequency input circuit connected in the individual control grid-cathode circuit of only one of the said tubes, a tuned differential output circuit of the said push-pull tubes, said output circuit tuned to the frequency of said low frequency source and coupled thereto a receiver responsive to current at the frequency of said low frequency source.

4. A high frequency receiving system according to claim 3 in which the said pair of push-pull electronic vacuum tubes have structural means adapting them to produce strong third-order modulation.

5. A high frequency receiving system comprising a pair of similar electronic vacuum tubes connected in push-pull relation, a low frequency source connected in the common or parallel portion of the control grid-cathode circuit of the said pair of push-pull vacuum tubes, a tuned output circuit connected differentially between the anodes of the said pair of tubes and tuned to the frequency of the said low frequency source, a receiver responsive to currents of the frequency of the said low frequency source and coupled into the said output circuit, and means in the individual control grid-cathode circuit of only one of the said pair of push-pull vacuum tubes for coupling thereto a source of high frequency electric energy.

6. A high frequency receiving system according to claim 5 in which the said low frequency receiver comprises an electric meter, as for example a dynamometer type of voltmeter.

7. A high frequency receiving system comprising two similar electronic vacuum tubes structurally adapted for strong third order modulation, untuned means adapted to couple a source of radiant energy into the control grid-cathode circuit of a first one of said vacuum tubes, tuned means adapted to connect a source of low frequency into the control grid-cathode circuit of the second one of said vacuum tubes in parallel with the control grid-cathode circuit of the first one of said vacuum tubes, and connected between the anode of said first tube and the anode of said second tube, an output circuit tuned to the frequency of said low frequency source.

8. A high frequency receiving system comprising two similar electronic vacuum tubes structurally adapted for strong third order modulation, untuned means of low impedance to low frequency adapted to couple a source of radiant energy into the control grid-cathode circuit of a first one of said vacuum tubes, tuned means of low impedance to high frequencies adapted to connect a source of low frequency into the control grid-cathode circuit of the second one of said vacuum tubes in parallel with the control grid-cathode circuit of the first one of said vacuum tubes, and an output circuit tuned to the frequency of said low frequency source connecting the anode of said first tube to the anode of said second tube in tandem.

9. A receiving system according to claim 8 in which the said electronic vacuum tubes are characterized by the possession of a cathode, an anode and a plurality of grids successively interspaced between said cathode and said anode and, numbering in sequence from cathode to anode, odd-numbered grids strapped together as controls in the input circuit, even-numbered grids connected as auxiliary anodes.

JOHN R. PIERCE.